(12) United States Patent
Ben-Arie et al.

(10) Patent No.: US 8,214,827 B2
(45) Date of Patent: Jul. 3, 2012

(54) METHOD AND SYSTEM FOR IMPROVING USER CONFIDENCE AND EXPERIENCE IN CONTENT PURCHASING VIA A SERVICE PROVIDER PREMISES

(75) Inventors: Ofek Ben-Arie, Givataim (IL); Karen Gold, Natanya (IL); Alex Cohn, Rosh Ain (IL); Zeev Ben-Sander, Gush Etzion (IL)

(73) Assignee: Flash Networks, Ltd, Herzliya (IL)

( * ) Notice: Subject to any disclaimer, the term of this patent is extended or adjusted under 35 U.S.C. 154(b) by 1279 days.

(21) Appl. No.: 11/563,838

(22) Filed: Nov. 28, 2006

(65) Prior Publication Data

US 2007/0127515 A1 Jun. 7, 2007

Related U.S. Application Data

(60) Provisional application No. 60/597,488, filed on Dec. 5, 2005.

(51) Int. Cl.
*G06F 9/44* (2006.01)
*G06F 9/445* (2006.01)
*G06F 15/16* (2006.01)

(52) U.S. Cl. ......... 717/178; 717/173; 717/177; 709/203

(58) Field of Classification Search .................. None
See application file for complete search history.

(56) References Cited

U.S. PATENT DOCUMENTS

| | | | |
|---|---|---|---|
| 5,835,724 A * | 11/1998 | Smith | 709/227 |
| 5,923,833 A | 7/1999 | Freund et al. | |
| 6,049,892 A * | 4/2000 | Casagrande et al. | 714/18 |
| 6,377,974 B1 * | 4/2002 | Feigenbaum | 709/203 |
| 6,381,709 B1 * | 4/2002 | Casagrande et al. | 714/18 |
| 6,606,646 B2 * | 8/2003 | Feigenbaum | 709/203 |
| 6,865,592 B1 | 3/2005 | Shindo | |
| 7,203,940 B2 * | 4/2007 | Barmettler et al. | 717/178 |
| 7,277,945 B1 * | 10/2007 | Shah et al. | 709/226 |
| 7,299,033 B2 * | 11/2007 | Kjellberg et al. | 455/414.1 |

(Continued)

OTHER PUBLICATIONS

Ólafur R. Helgason et al. "A Mobile Peer-to-Peer System for Opportunistic Content-Centric Networking", [Online], 2010, pp. 21-26, [Retrieved from Internet on Mar. 2, 2012], <http://delivery.acm.org/10.1145/1860000/1851330/p21-helgason.pdf>.*

(Continued)

*Primary Examiner* — Thuy Dao
*Assistant Examiner* — Ziaul A Chowdhury
(74) *Attorney, Agent, or Firm* — Smith Risley Santos LLC; Gregory Scott Smith (57) ABSTRACT

A system that listens to the data traffic running over the Service Provider Premises between the plurality of surfers and the Internet. The system can identify downloading of a content object. The data transportation of each user can be parsed for identifying a connection that is involved in downloading a content object from a content server. When a downloading of a content object is identified, the download process is monitored and resuming information is stored. In case that the download process is incompletely terminated the stored resuming information can be used to accelerate the response to a request to renewal the download process of the same object.

18 Claims, 5 Drawing Sheets

U.S. PATENT DOCUMENTS

| | | | |
|---|---|---|---|
| 7,664,860 B2* | 2/2010 | Beck et al. | 709/227 |
| 7,904,900 B2* | 3/2011 | Forsyth | 717/178 |
| 7,913,246 B2* | 3/2011 | Hammond et al. | 717/173 |
| 2001/0014103 A1* | 8/2001 | Burns et al. | 370/429 |
| 2002/0099798 A1* | 7/2002 | Fedorovsky et al. | 709/219 |
| 2003/0028870 A1* | 2/2003 | Weisman et al. | 717/178 |
| 2003/0101446 A1* | 5/2003 | McManus et al. | 717/178 |
| 2003/0221014 A1* | 11/2003 | Kosiba et al. | 709/231 |
| 2004/0008688 A1* | 1/2004 | Matsubara et al. | 370/395.21 |
| 2004/0117459 A1* | 6/2004 | Fry | 709/219 |
| 2004/0233866 A1* | 11/2004 | Bossoli et al. | 370/328 |
| 2005/0108706 A1* | 5/2005 | McCain | 717/177 |
| 2005/0125445 A1 | 6/2005 | Cotner et al. | |
| 2005/0132082 A1* | 6/2005 | Lee et al. | 709/231 |
| 2007/0169106 A1* | 7/2007 | Douglas et al. | 717/173 |
| 2008/0263180 A1* | 10/2008 | Hurst et al. | 709/219 |

OTHER PUBLICATIONS

Saikat Guha et al., "An End-Middle-End Approach to Connection Establishment" [Online], 2007, pp. 193-204, [Retreived from Internet, on Mar. 2, 2012],<http://delivery.acm.org/10.1145/1290000/1282403/p193-guha.pdf>.*

Jorg Ott et al., "A Disconnection-Tolerant Transport for Drive-thru Internet Environments" [Online], 2005, pp. 1849-1862, [Retrieved from Internet on Mar. 2, 2012], <http://ieeexplore.ieee.org/stamp/stamp.jsp?tp=&arnumber=1498464>.*

Upkar Varsheney et al., "Mobile Commerce: Framework, Applications and Networking Support", [Online], 2002, pp. 185-198, [Retreived from Internet on Mar. 2, 2012], <http://delivery.acm.org/10.1145/550000/545032/p185-varshney.pdf>.*

* cited by examiner

METHOD AND SYSTEM FOR IMPROVING USER CONFIDENCE AND EXPERIENCE IN CONTENT PURCHASING VIA A SERVICE PROVIDER PREMISES

CROSS-REFERENCE TO RELATED APPLICATIONS

This patent application is a U.S. non-provisional application filed pursuant to Title 35, United States Code §100 et seq. and 37 C.F.R. Section 1.53(b) claiming priority under Title 35, United States Code §119(e) to U.S. Provisional Application for Patent having been assigned the Ser. No. of 60/597,488 and filed on Dec. 5, 2005 naming Ofek Ben-Arie, Keren Gold, Alex Cohn, and Zeev Ben-Sander as the inventors, which application is herein incorporated by reference.

BACKGROUND

The present invention relates to telecommunication field, and more particularly to downloading content objects and or content purchasing via a service provider premises.

During the recent years, electronic commerce and electronic business (EB) conducted over the Internet has not only increased, but has become common place. One popular segment of EB is that related to the purchasing of content from a content server. The purchased content can include a variety of items, such as a document, a record, a video movie, etc. The process of purchasing content through EB is accomplished by surfing a network, such as but not limited to, the Internet. Surfing is performed using a browser application to retrieve information that is embedded within web pages stored in one or more content servers. In general, the surfing process includes identifying or selecting certain content objects, placing an order for one or more content objects and then downloading or receiving the delivery of those objects. Surfing the Internet is typically accomplished via a service provider premises that connects the surfer (a user of the service provider's customer) to the network. An exemplary service provider premises can be an Internet service provider (ISP), a content service provider, a network service provider (a telecom carrier) such as but not limited to cellular service provider, satellite service provider, etc. Henceforth, the description of the present invention may use the term 'Service Provider Premises' (SPP) as a representative term for any of the above group of service provider premises as well as other service provider premises not listed. A common content purchasing session or just a common content downloading process can be based on a data communication protocol, such as but not limited to, the Internet Protocol (IP). Usually a content downloading session starts by requesting a web page from which a user can proceed to make selections in accordance with his preference.

For purposes of clarity, a "web page," is to be considered as a file or document created for use in the World Wide Web environment (hereinafter, "Web") or similar network. Web pages are typically located using a Uniform Resource Locator (URL), which is a form of address adapted to use in the distributed network environment of the Web. Web pages are typically encoded in Markup Language (ML) such as, but not limited to, the Hyper Text Markup Language, or (HTML), Extensible Markup Language (XML), Wireless Markup Language (WML), XHTML, Handheld Markup Language (HDML), etc. Some of those languages are actually used for displaying content on the displays of cellular telecommunication based devices. A "browser" is a software application at a user device that is adapted to process Web documents. A common Web page includes a plurality of links to other pages or objects. Some of the links are associated with content objects such as, but not limited to, images, sound files (records), video movies, articles, books, etc. Those content objects can be purchased by a surfer.

There are some limitations, problems, vulnerabilities and perceptions in purchasing content objects over the Internet that result in reducing the user's willingness to participate in a purchasing session. One of the limitations is a risk that a failure over the connection may break the downloading process resulting in wasted time and potentially purchasing or receiving corrupted content. Such a failure can be the result of congestion over the connection, priority that is given to other types of communication (real time communication, for example) that shares the same bandwidth, and/or problems in the physical carrier network. As an example, consider the following situation. The user equipment being used to access the content and download the content is a mobile terminal that is connected to the web site containing the desired content, at least partially over a cellular network connection. The downloading process can be interrupted or corrupted simply by a hand off as the mobile terminal moves from one cell to another.

As more and more content becomes available through global networks, it is quite common to encounter content objects that include a considerably large volume of a data. Downloading of such an object may take a long period of time. This is especially true when the download is performed over a low bit rate connection, such as but not limited to, a cellular connection. Unfortunately, increasing the duration of the download process increases the probability that a failure in the connection will occur during the download process.

When there is a break or interruption during the process of downloading a content object, several categories of negative results may occur. For instance, the user may be charged for an incomplete transaction resulting in possessing a useless data file. If the user wishes to retry the download process, then the user may be required to start all over from the beginning; surfing the network looking for the appropriate location of the content; purchasing the content and restarting the download process from the beginning hoping that this time the download will terminate successfully.

There has been a few attempts in the art to provide techniques to address these issues, namely techniques attempting to improve the fidelity of purchasing over a network and offer different methods to over come problems that are due to disconnection during downloading an object. Some of the techniques are depicted in U.S. Pat. Nos. 5,923,833 or 6,865,592 and in US publication number: US 20040008688 or US 2005-0125445, the contents of which are incorporated herein by reference.

Some of the above attempts in the prior art to address these needs required a client application to be installed in a user's equipment prior to commencing the transaction. Another technique is used in conjunction with a certain cluster of content servers and is used to protect the certain cluster.

Therefore there is a need for a solution to be used in a service provider premises that can operate to improve the reliability of purchasing content over the Internet. Such a system should be able to handle a plurality of different purchasing sessions occurring simultaneously between a plurality of users with a plurality of different content servers. The operation of the system should be transparent to the surfing equipment (thus no client application is required to be installed prior to the purchasing process) as well as to the content servers.

Furthermore there is a need in the art for a system that can determine when a break in the download process occurs; compensate the payment information that is relevant to the broken process; and actually includes the capability to improve a user's experience in the recovery from an incomplete download. In addition there is a need for a system that will reduce re-surfing the Internet for the required location of the relevant content object.

SUMMARY OF THE INVENTION

Various embodiments of the present invention solve the above-described needs in the art by providing a system and a method for improving a user's confidence and experience during purchasing of a content object over the Internet. An exemplary system can be installed at a service provider premises. The service provider can be a telecom carrier such as, but not limited to, a cellular service provider, a satellite communication service provider, a PSTN carrier, an access network service provider, etc. Other exemplary embodiments of the present invention can be installed in an Internet Service Provider (ISP) premises, for example.

One exemplary embodiment of the present invention listens to the data traffic running over the Service Provider Premises between the plurality of surfers and the Internet. The system identifies content object downloading processes. Another exemplary embodiment of the present invention can be installed in a service provider premises in front of a border gateway or border router. Such an embodiment operates to intercept the data communication directed towards and received from the Internet. The data transportation of each user can be parsed to identify a connection that is involved in a downloading process thereby receiving a content object from a content server. When a downloading process is identified, then one or both TCP stacks that are associated with the connection (one with the connection between the exemplary system and the user and the other for the connection between the exemplary embodiment of the present invention and the content server) can be modified to accelerate the identification of a break in the download process. An exemplary modification can be configured during the installation of the present invention. The configuration modifies a function that is used for calculating the time interval to the first retransmit request (timeout) so as to shrink this time interval. This manipulation accelerates one or more retransmitted requests and accelerates the time for determining that the connection has been broken.

In various embodiments of the present invention, when the determination is made that a connection between a particular surfer and a particular content server (URL) carries a content object, the present invention may start collecting information pertaining to this session. The information is logged in a recovery database (RDB). The type of information that is logged can later be used to resume the session. For example, the last URL that is associated with the content object is saved. In an alternate exemplary embodiment of the present invention a copy of the downloaded object can be stored in parallel with the download process. The copy (shadowing data) can be stored in the RDB, etc. Yet in another exemplary embodiment, both techniques may be employed, saving the URL information and the shadowing data technique.

Another aspect of embodiments of the present invention is the monitoring of a download connection. Thus, during the continuation of a connection which has been identified as carrying a content object, an exemplary embodiment of the present invention monitors the connection. If the download process successfully terminates, then the entry in the RDB that is relevant to this session can be released. If the download session breaks before reaching the end of the content object, then the relevant entry in the RDB can be saved for a configurable period of time (such as for a few minutes up to a few hours, for example) and then it can be released. However, if a request for resuming the session is received, then the entry in the RDB is used for establishing the resumed session. After the RDB entry is used, then it can be released and a new entry can be issued for the resumed session. In an alternate exemplary embodiment of the present invention, the old entry in the RDB for the interrupted session can be updated and be used for the resumed session.

Upon identifying a break in the download process of a content object, an exemplary embodiment of the present invention may send a notification message to an appropriate entity in the service provider premises. This notification can be used to discard the consequences of an uncompleted session. For instance, if billing is involved in the downloading process, then a call detail record (CDR) may be sent to a billing server to cause a rollback of the payment for the content object.

Yet an alternate exemplary embodiment of the present invention may respond to a request for a home page or a first request to any other web page, which is coming from a user that has been disconnected, by sending a modified page. The modified page may include a link prompting the user to request the resumption of the uncompleted downloading process. Selecting this link by the user would operate to start a resuming process.

Another exemplary embodiment of the present invention that operates to intercept the data communication directed towards and received from the Internet, may store the data payload coming from the content server as an entry in the RDB, shadowing the content of the content object. When a break is identified in the download process (such as the breaking of the connection to the user), an exemplary embodiment of the present invention may operate to take over the communication with the content server, impersonating the user, and after terminating the session, storing the information of the entire content object in the appropriate entry in the RDB. When a resume request is received, the content of the requested file can be delivered directly from the appropriate entry in the RDB rather then the originally sourcing website. This operates to reduce the time required for surfing the web back to the appropriate location in the content server and fetching the data from the beginning of the file.

Different methods can be used to identify processes for the downloading of content objects. One exemplary method includes comparing the URL of the payload carried by the packets coming from the Internet with a list of URLs of content servers. Another exemplary method may check the type of the file that is embedded within the payload of the packets coming from the Internet. For example, file types such as .mp3, mpg, .mp4, and .avi can be used to identify the downloading of a content object. Yet by another alternate method, a content object can be identified by the content type field in the HTTP header of the packet coming from the Internet. For example, Digital Right Management (DRM) type, Executable type, etc. may identify a content object. In some cases, in which billing is involved, an embodiment of the present invention may receive the billing header that is added by the content provider to the packet. It will be appreciated that in varying embodiments and implementations of the present invention, one of, or any combination of two or more of the above identifying methods can be used.

Exemplary embodiments of the present invention can be transparent to the user's device as well as to the content server. Other objects, features, and advantages of the present invention will become apparent upon reading the following detailed description of the embodiments with the accompanying drawings and appended claims.

DETAILED DESCRIPTION OF EMBODIMENTS OF THE INVENTION

Various embodiments, aspects and features of the present invention, either separately or when combined, operate to provide an improvement in the art for managing content download sessions over a global data network. In general, embodiments of the invention operate by detecting a remote terminal originated request to download a content object from a content server. In one embodiment, this detection is made by an apparatus that is positioned communicatively between the remote terminal the content server. The commencement of the downloading process of the content is detected and then monitored. Resuming information about the downloading process is maintained and stored for future reference. If a premature termination of the downloading process is detected, a resolution to the incomplete process is administered by embodiments of the invention. The administering can vary depending on a variety of circumstances. For instance, if a renewal of the terminated download process is initiated, one set of actions are taken and a different set of actions are taken if a timeout event occurs.

Turning now to the figures in which like numerals represent like elements throughout the several views, exemplary embodiments, features and aspects of the present invention are described. For convenience, only some elements belonging to the same group of elements may be labeled with numerals. The purpose of the drawings is to describe exemplary embodiments and not for production. Therefore features shown in the figures are chosen for convenience and clarity of presentation only.

Figure 1:
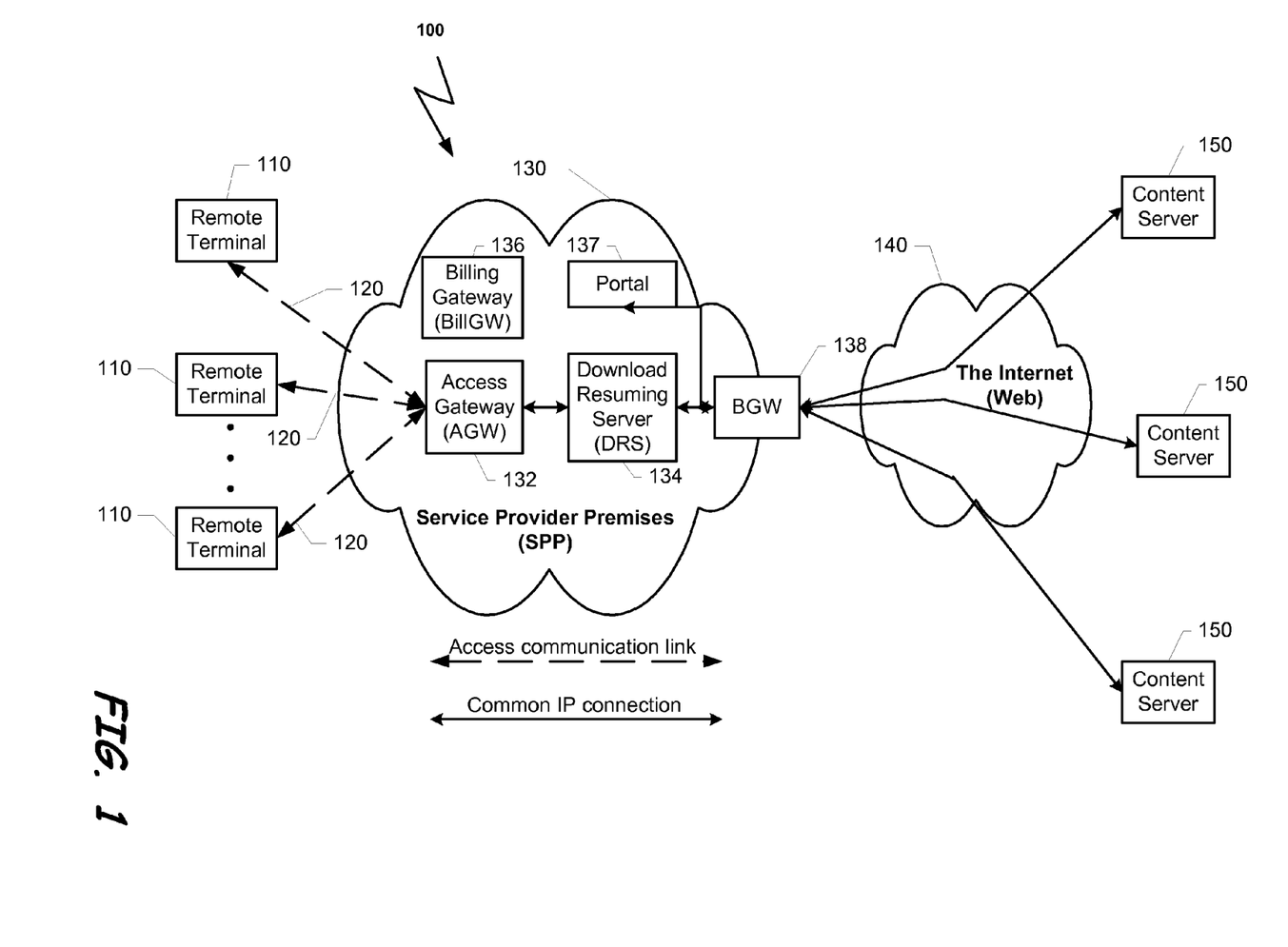
FIG. 1 illustrates a block diagram of an exemplary communication system that implements an exemplary embodiment of the present invention.

FIG. 1 illustrates a block diagram of an exemplary communication system that implements an exemplary embodiment of the present invention. A communication system 100 is illustrated with the various elements necessary to implement an exemplary embodiment of the present invention. The communications system 100 may be based on any of a variety of communication networks including telecommunication and data communication networks as well as a combination of one or more types of networks. As non-limiting examples, the communication system 100 maybe based on a cellular data communication network, satellite networks, access networks, Internet Service Provider (ISP), or other type of network or communication system. Within the context of this description, the terms cellular, satellites, wireless, and ISP may be used interchangeably and at times, may have the same meaning.

System 100 is illustrated as including one or more remote terminals 110; a service provider premises (SPP) 130, a network 140 such as but not limited to the Internet (which can also be referred to as the World Wide Web (WWW)); and one or more Content Servers 150. An exemplary SPP 130, among other elements, may comprise an access gateway (AGW) 132, a download resuming server (DRS) 134, a border gateway (BGW) 138, and a billing gateway (BillGW) 136. Furthermore, the SPP 130 may also include a portal 137 of the service provider. Exemplary embodiments of the present invention refer to the portal 137 as one of the content servers 150. Usually the data communication between different elements of the SPP 130 is based on Internet protocol (IP).

It will be appreciated by those skilled in the art that, depending upon its configuration and the needs, communication system 100 may comprise more than the three illustrated Content Servers 150 and remote terminals 110. However, for purposes of simplicity of understanding, three units of each are shown. It should be noted that the terms "content server" and "web server" may be used interchangeably herein. Henceforth, the description of embodiments of the present invention may use the term 'sserver' as a representative term for a content server. a web server or any other type of server that may be surfed by a user. It should be noted that the terms "remote terminal", "client", "surfer", "user's device" and "user" may be used interchangeably herein.

Communication system 100 is based on Internet Protocol (IP), for example. It may represent one or more networks segments, including but not limited to one or more Internet segments, one or more Intranets, etc. Communication system 100 may run over one or more type of physical networks such as but not limited to Public Switched Telephone Network (PSTN), Integrated Services Digital Network (ISDN), Cellular network (G2, G3 & G3.5), satellite, etc. It should be appreciated that the communication system 100 may also run over a combination of these networks. Communication system 100 may include intermediate nodes along the connection between a client and a content server. The intermediate node may include, but is not limited to, IP service provider servers, cellular service provider servers and other types of service providers equipments.

One or more remote terminals 110 may be served by the communication system 100 and able to access content servers 150 via the SPP 130 and the Internet 140. A common remote terminal 110 may run a browser software application for surfing the network and to communicate with one or more content servers 150. As non-limiting examples, the browser applications may include a products such as those available from Openwave Systems Inc. or Opera Mobile Browser (a trademark of Opera Software ASA), Explorer (a trademark of Microsoft), etc. Non-limiting examples of the remote terminals 110 include personal computers (PC), notebook computers, cellular phones, handheld computers, personal data assistants (PDA), or any other computing device with wire or wireless communication capabilities, etc.

The remote terminals 110 are illustrated as being connected via data links 120 to the Access Gateway (AGW) 132 within the SPP 130. The connection between the remote terminals 110 and the SPP 130 may be via intermediate nodes (such as a base station etc,) not shown in FIG. 1. The AGW 132 acts as an access gateway between the network protocol that is used over communication links 120 and the IP network that is used over the SPP 130. In some embodiments of the present invention AGW 132 may act also as an Authentication, Authorization, and Accounting (AAA) agent for the remote client. Exemplary AGW 132 may be a Remote Access Server (RAS), a Gateway GPRS Support Node (GGSN) or a Packet Data Serving Node (PDSN) or a CDMA2000 Radio Access Network (RAN) or any other similar node.

The Border Gateway (BGW) 138 is the interface between the Internet 140 and the SPP 130. The BGW 130 may operate to route the upload communication toward the appropriate destination over network 140. When the upload communication is a request for content objects, the BGW routes the request to the appropriate content server 150. The terms BGW and Border Router may be used interchangeably throughout this description. In the download direction, the BGW 138 receives incoming packets from the different content servers 150 and distributes them to the appropriate modules of the SPP 130. Usually packets that are targeted towards a remote terminal are transferred to the AGW 132.

The billing gateway (BillGW) 136 handles billing data that is associated with the purchase of content objects from the content servers 150 by the remote terminals 110 that are the connected to or interface with the SPP 130. Billing information (typically in the form of call detail records—CDR) that is associated with the purchase of a content object is sent by the appropriate content servers 150 to the BillGW 136. Identification information of the remote terminal 110 requesting and purchasing the content object and that is associated with the same purchasing event is transferred from the AGW 132 to the BillGW 136. In an alternate exemplary SPP 130 an authentication module (not shown) may send identification information on the relevant users instead of the AGW 132. The identification information can be bounded or incorporated within the CDR by the BillGW 136. Furthermore, the BillGW 136 can be configured to get CDRs from the DRS 134. The CDRs received or obtained from the DRS 134 indicate that the download process was unsuccessfully terminated and therefore, the charges need to be reversed (a rollback of the charges). Information from the BillGW 136 can be used for collecting the payment for the content objects that were purchased. The payment can be collected directly by the operators of the content servers 150 or via the operator of the SPP 130.

An exemplary embodiment of a download resuming server (DRS) 134 can intercept traffic being communicated between the AGW 132 and the BGW 138 and receive all the packets that are flowing between the AGW 132 and the BGW 138. Therefore the DRS 134 receives the data transportation that is transferred between the remote terminals 110 and the the content servers 150. In one exemplary embodiment, the DRS 134 may be configured as the default gateway for both sides of the SPP 130, (i.e., for AGW 132 and for the BGW 138). In another exemplary embodiment, the DRS 134 may physically reside between the AGW 132 and the BGW 138. In both cases, the DRS 134 may be transparent to both sides of the connection, to the remote terminal 110 or to the content servers 150. In an alternate exemplary embodiment of the present invention, the DRS 134 may be used as a proxy. In such a situation, the remote terminals 110 can be configured to communicate via DRS 134.

The data that is transmitted from each of the remote terminals 110 can be parsed to determine if the connection carrying the data is involved in a session of downloading a content object from a content server 150. Downloading of content objects are detected, recorded and tracked by the various embodiments of the present invention. When the DRS 134 identifies a break or interruption in the process of downloading of a content object, the recorded information on the broken session is stored and can be used for resuming the download process. In some exemplary embodiments of the present invention, upon identifying a break in a content downloading session which involves payment, a rollback CDR may be sent from the DRS 134 to the BillGW 136. More information on the operation of the DRS 134 is depicted below in conjunction with the description of FIG. 2 and FIGS. 3A, 3B and 3C.

Figure 2:
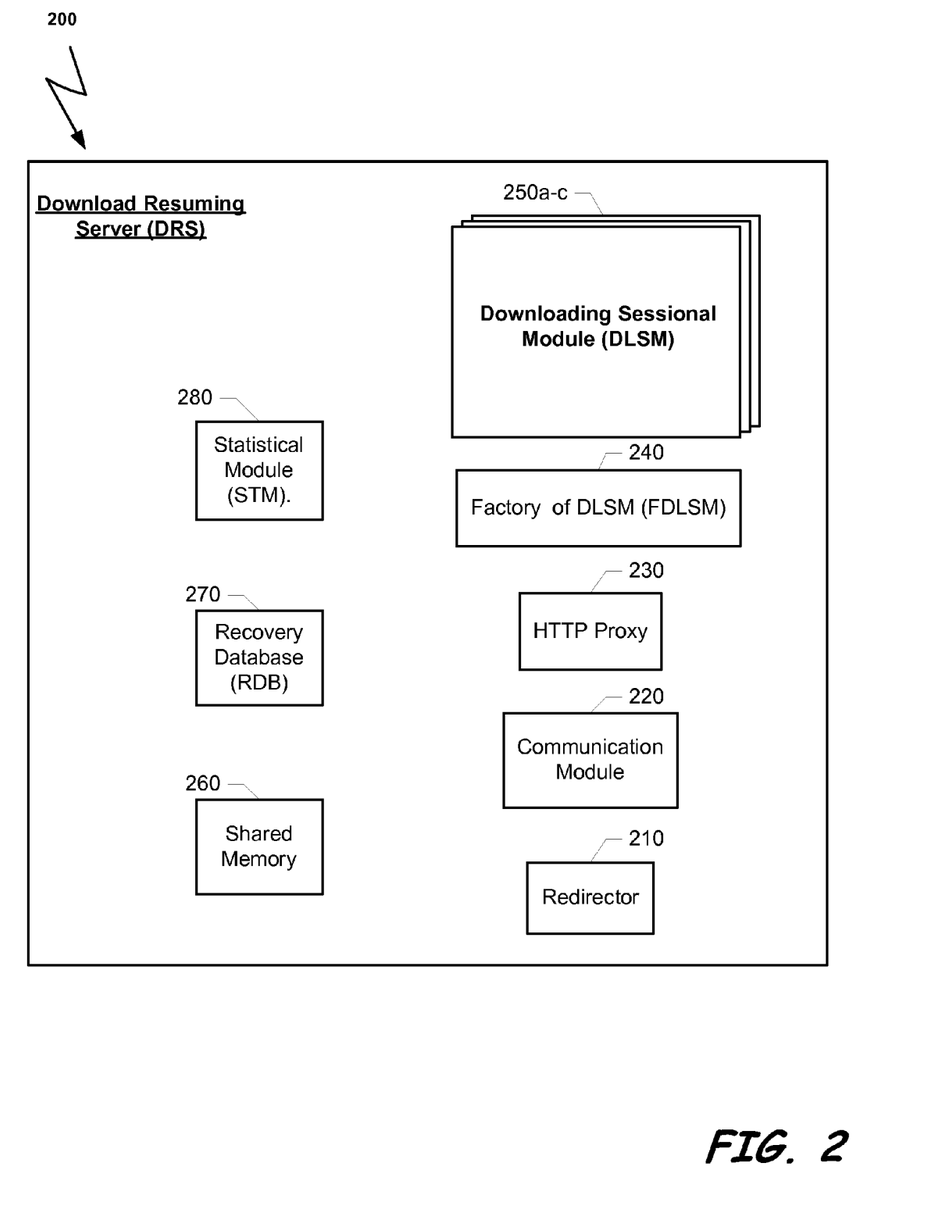
FIG. 2 illustrates a block diagram of relevant logical modules of an exemplary embodiment of the present invention.

FIG. 2 is a block diagram illustrating relevant elements of a Download Resuming Server (DRS) 200 that operates according to an exemplary embodiment of the present invention. The DRS 200 may be associated with an SPP 130 (FIG. 1) as an intermediate node between the AGW 132 and the BGW 138. Within the context of the Open System Interconnection (OSI) Reference Model seven layer communication stack that can be used between the two communication nodes AGW 132 and BGW 138, the DRS 200 can be implemented by using an HTTP proxy with additional applications. The additional applications can operate above the sessional layer (layer 5 of the OSI model) and on the layer below the sessional level, the transport layer (layer 4 of the OSI model, the TCP layer).

In an exemplary embodiment of the present invention, the DRS 200 can be operative to perform the following tasks: (a) follow-up or track sessions that are downloading content objects; (b) record information that can be used for resuming a broken session (resuming information); and (c) identify a break in the session and accelerate the resuming of a renewal download process. An exemplary DRS 200 may comprise a redirector 210, a communication module 220, an HTTP proxy 230, a factory of download sessional module (FDLSM) 240, one or more sessional modules or downloading sessional module (DLSM) 250a-c, (one for each current user that is communicating with the DRS 200), a shard memory (SM) 260, a recovery database (RDB) 270 and a statistical module (STM) 280. It will be appreciated by those skilled in the art that depending upon its configuration and the needs, the DRS 200 may comprise more than three of DLSMs 250a-c. However, for purposes of simplicity of understanding, three units of each are shown.

In exemplary embodiments of the present invention in which the operation of the DRS 200 is transparent to the user, a redirector 210 can be used. The redirector 200 collects packets coming from the remote terminals 110 (FIG. 1) toward the content servers 150 and redirects the packets to the CM 220. In addition, the redirector 220 maintains the connection that was initiated by the user and takes care to handle IP addresses of packets going toward the user. In an alternate exemplary embodiment of the present invention in which the DRS 200 is configured as a proxy at the remote terminals, the redirector 210 can be eliminated.

As part of the OSI seven layer communication stack, the communication module (CM) 220 is adapted to handle the first four layers: the Physical Layer 1, Link Layer 2, Network Layer 3, and the Transport Layer 4 (the TCP stack). In addition to its common operation, the CM 220 is adapted to fulfill a unique requirement of the DRS 200. In one exemplary embodiment of the present invention, the CM 200 is adapted to get messages from the DLSM 250 with the IP address of the relevant user for spoofing or imitating the source IP address of packets going toward the content servers. The IP address of the relevant user is used as the source IP address instead of the IP address of the DRS 200. The message may be sent in the first packet going from the DLSM 250 toward a content sever. The message can include the IP address of the relevant user. The CM 220, upon receiving the message, instructs the TCP stack to spoof the source IP address and use the IP address of the remote terminal as the source IP address instead of the IP address of the DRS 200.

In alternate exemplary embodiment of the present invention the remote terminals can be configured to use the DRS 200 as a proxy. In such an exemplary embodiment of the present invention spoofing is not needed. Yet in an alternate exemplary embodiment of the present invention, the DRS 200 can acts as an agent of the BillGW 136. As an agent, the DRS 200 can inform the BillGW 136 which remote terminal and which content server was involved in a certain download session of a content object. In such a case, the operation of the DRS 200 may not be transparent to the content server and spoofing is not needed.

In an alternate exemplary embodiment of the present invention, during the installation of DRS 200 the TCP stack of CM 220 may be configured to reduce the timeout interval in order to accelerate the process of identifying a disconnection event.

From the CM 220, packets are transferred via the HTTP proxy 230 to the FDLSM 240. In one exemplary embodiment of the present invention, the FDLSM 240 is adapted to open a new DLSM 250 upon receiving a first request from a new remote terminal 110 (FIG. 1). The DLSM 250 is maintained as long as a user or process is maintaining an active session on the remote terminal. Terminating the DLSM 250 can be done in two instances or upon the occurrence of two events. The first event is when a download session is terminated successfully without any breaking and the session becomes inactive. The second event is when a download process is broken or interrupted prior to completion. In the second event, terminating the appropriate DLSM 250 can be performed upon receiving a message from the relevant DLSM 250 requesting the FDLSM 240 to release the resources that have been associated with that particular session on that particular remote terminal or with a particular user. In such an embodiment, the DLSM 250 manages the resuming information that is stored in the RDB 270 and determines when to delete the resuming information and release resources that are associated with a broken connection.

Furthermore, the FDLSM 240 is adapted to check for the existence of a DLSM 250 that is associated with a request to set a connection with a new user or remote terminal 110. If such a DLSM 250 exists, the existence indicates that the request is coming from a remote terminal 110 that has a previous session that was disconnected. Such a remote terminal or user is referred as a renewal user. Checking for the existence of a DLSM 250 which is associated with new user or remote terminal 110 can be accomplished by searching for an entry in a users table that is associated with the ID number of the user or remote terminal, or a session ID. An exemplary ID number can be the MSISDN number. The MSISDN number can be retrieved from a notification that is sent by the AGW 132 (FIG. 1) to the appropriate modules of the portal 130 including the DLS 134.

Yet in an alternate exemplary of the present invention, the FDLSM 240 can be adapted to open a new DLSM 250 for each new TCP connection and then to terminate the DLSM 250 when the TCP connection is terminated. In such an embodiment, the FDLSM 240 manages the resuming information that is stored in the RDB 270 and determines when to delete the resuming information and to release the resources that are associated with a broken connection. The decision can be based on information stored in the users table and/or the RDB 270.

The users table can be located in the shared memory 260 and is used to store tracking and associating information on the data or information that passes through the DRS 200. An entry in the users table may include a user's MSISDN, the user's current IP address, the relevant URL of the current content object, the associated DLSM 250, time etc. The users table can be approached by different modules of the DRS 200 and is used in order to route information between modules and to reach decisions during the operation of the DRS 200. Therefore, the users table may include status information such as, but not limited to: a new page indication, purchasing session indication, "new content object indication"; or indication on successfully ended downloading sessions; or unsuccessfully terminated sessions such as but not limited to a "breaking indication"; or renewal requests, for example "Renewal indication", etc.

In an embodiment of the present invention in which the FDLSM 240 releases the DLSM at the end of each TCP connection, the information in the users table can be used by the FDLSM 240 for determining whether to release resuming information that is stored in the RDB 270 or whether a new user is a renewal (i.e., one that is associated with a previous session that has been disconnected), etc.

After its initiation by the FDLSM 240, the DLSM 250 may perform the functionality that is needed for recovering from a discontinuity occurring in a downloading process of a content object. The DLSM 250 communicates with its associated user or remote terminal 110 and the current content server via the HTTP proxy 230. Among its tasks, the DLSM 250 writes and reads resuming information in the RDB 270; can instruct the CM 220 to spoof the source address of packets going to a content server; controls the resuming session; sends statistical information to the STM 280, etc. More information on the operation of the DLSM 250 is disclosed below in conjunction with the descriptions of FIGS. 3A, 3B and 3C.

The shared memory 260 can be a part of the RDB 270 and/or a section of the RAM (random access memory) of the DRS 200. This section is used as an interface between the different modules of the DRS 200 and for storing the user's table. Each one of the modules may have a queue in the shared memory 260. Transferring information between the different modules can be done by placing a pointer to the information in a queue that is associated with the relevant module. The recovery database RDB 270 is the database that stores information on the current downloading of content objects as well as records of recent broken or interrupted download sessions. The information can include location information (URL) of the relevant objects. In other exemplary embodiments of the present invention, the information may also include shadowing data of the content objects that are currently being or that were attempted to be downloaded. The information in the RDB 270 is managed by the DLSMs 250 that write, read and delete the relevant information. In an alternate embodiment of the present invention, the FDLSM 240 determines when to release resuming information in the RDB 270.

The statistical module (STM) 280 gets information from the different DLSMs 250. The obtained information may identify successfully ended downloading sessions, unsuccessfully ended sessions, renewal requests, etc. Each identified session can include the user ID, the relevant URL, the time, the status of the session, etc. Based on this information, the STM 280 may generate reports that can be used by the operator of the SPP 130 (FIG. 1).

Figure 3A:
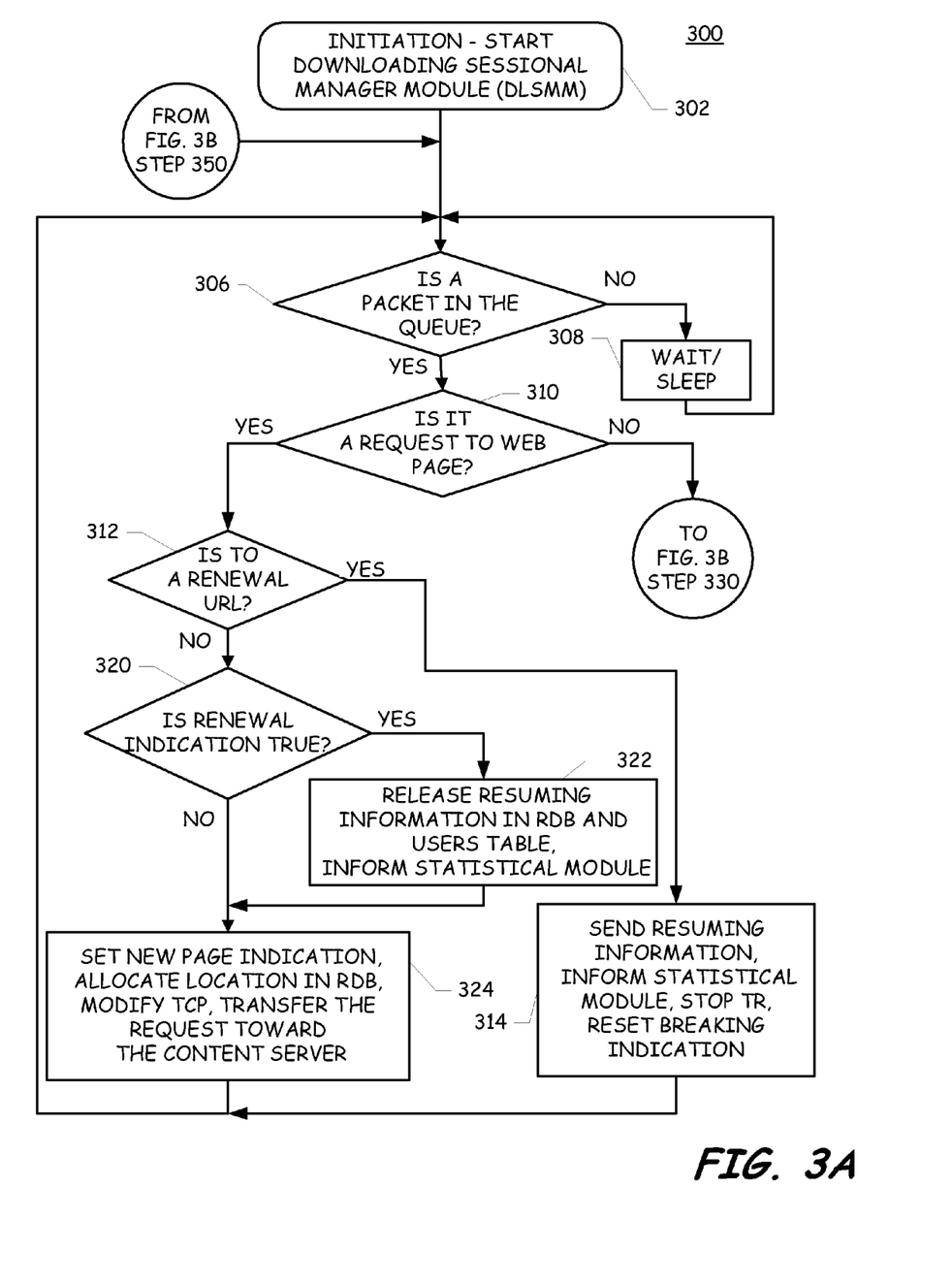
FIG. 3A, FIG. 3B and FIG. 3C illustrate a flowchart of relevant steps in an exemplary method that may be used in an exemplary downloading sessional module manager (DLSM).
Figure 3B:
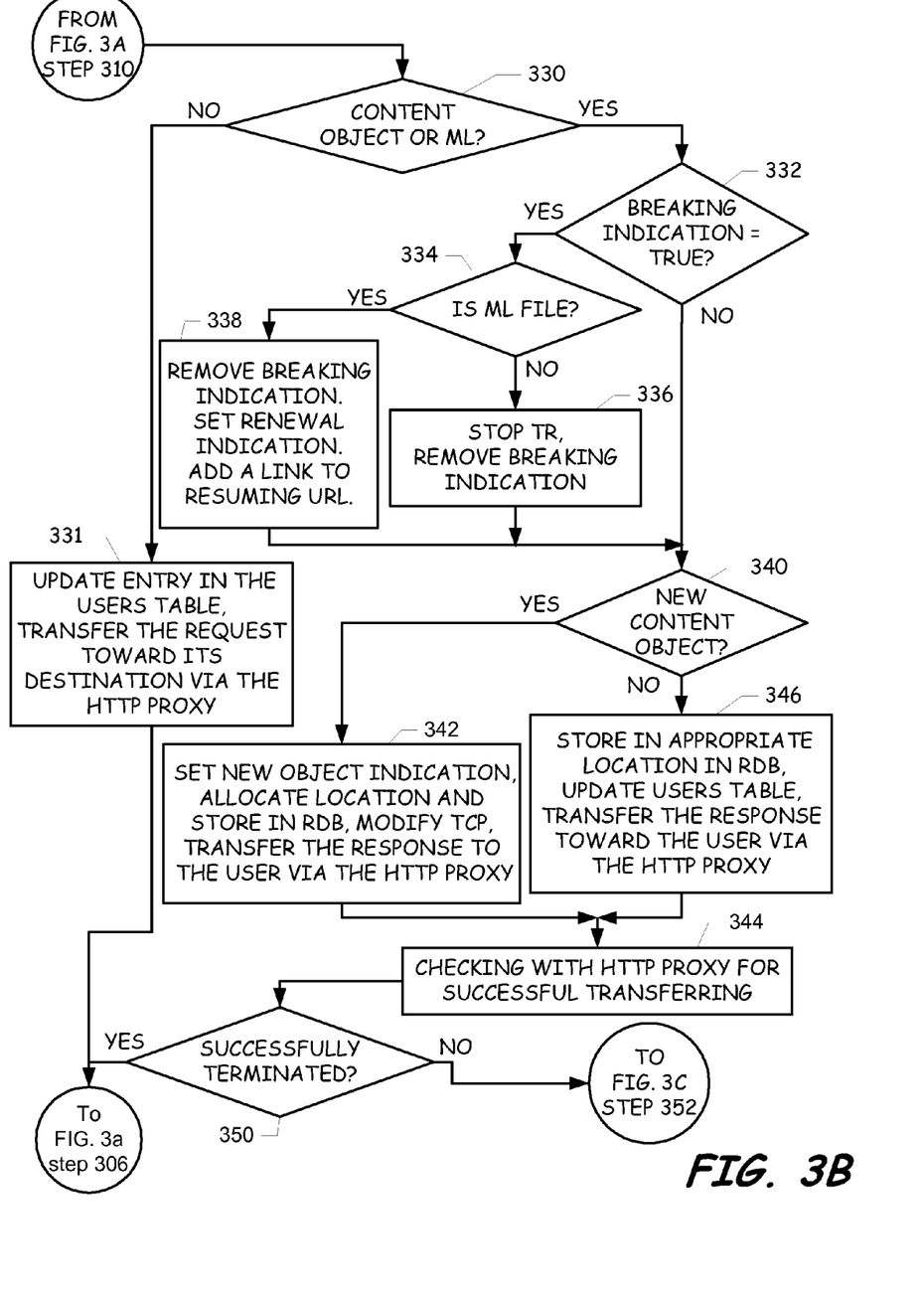
Figure 3C:
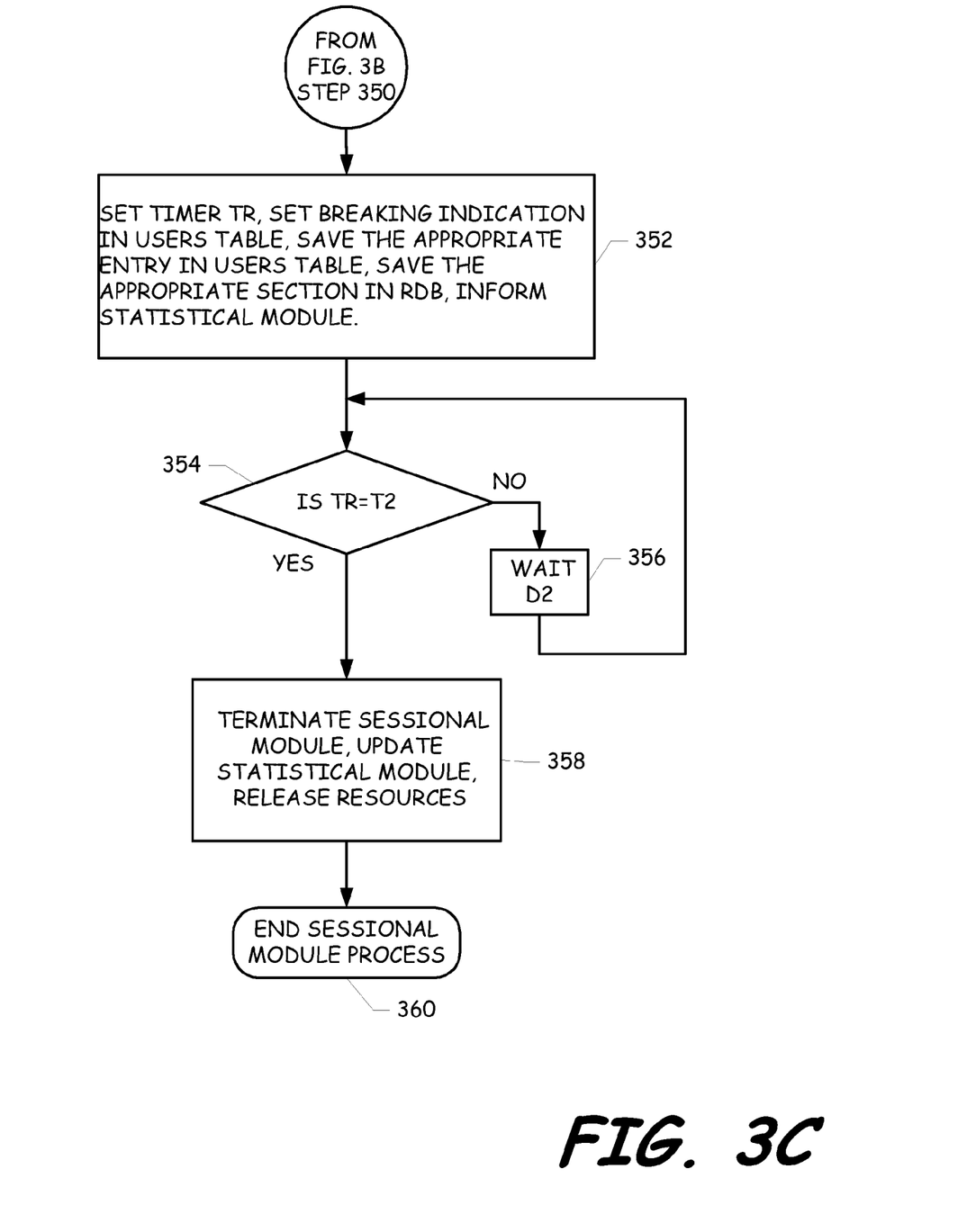

FIGS. 3A, 3B and 3C illustrate a flowchart with relevant steps in an exemplary method 300 that can be used by a download session module (DLSM) 250 (FIG. 2) for handling discontinuity events during downloading of a content object. The method 300 may be initiated 302 by the FDLSM 240 (FIG. 2) upon receiving a request from a new user 110 (FIG. 1). The method 300 is initiated after creating a new DLSM 250 that will be associated with the new user. After initiation 302, the method 300 may run in a loop as long as the user or remote terminal 110 is active or are engaged in an active surfing session. During the initiation process 302, the DLSM 250 may get information on relevant resources (such as but not limited to the queues in the SM 260), relevant entries in the users table that are associated with the user, etc.

In alternate exemplary embodiment of the present invention, a new DLSM 250 can be initiated by the FDLSM 240 for each request to setup a new TCP connection. In such an embodiment, the FDLSM 240 searches the RDB 270 or the users table for an entry that is associated with the ID number of the user. Based on the existence of an entry and/or its content, the FDLSM 240 determines how to proceed.

At step 306 a queue of the DLSM 250 (FIG. 2) is checked and a decision is made as to whether a pointer to a next packet exists (i.e., is there a packet in the queue). If no pointer exists, then the queue is empty and the method 300 waits 308 and rechecks the queue at a later time. If a pointer does exist, then there is a packet in the queue and the method 300, continues in accordance with the type of the packet that is up next in the queue. If the packet is a not a request to a web page 310 the method 300 proceeds to step 330 in FIG. 3B. However, if the packet is a request to a web page 310, then a decision is made as to whether the requested URL is a renewal URL 312. In one exemplary embodiment of the present invention the renewal URL is the URL that was added to a first ML file that was sent to a renewal user or remote terminal 110. A renewal user or remote terminal 110 is one for which a previous downloading session was broken or interrupted. The renewal URL can prompt the user to use the renewal accelerating process. Alternatively, a renewal URL can be the URL which was used during the last incomplete downloading process.

Receiving a request to get a web page from the renewal URL 312 indicates that the user is wishing to resume the previous download session by using the resuming information. Therefore, the resuming information is retrieved from the appropriate location in the RDB 270 (FIG. 2). In one exemplary embodiment of the present invention, the resuming information is the last URL from which the last content object was delivered. In such a case, the last URL is added as a link to a resuming web page and is sent via the HTTP proxy 230, the CM 220 and the redirector 210 (FIG. 2) toward the user or remote terminal 110 in step 314. In such embodiment, there is a time savings realized in that there is not need to surfing back to the last URL.

In alternate exemplary embodiment of the present invention, the DLSM 250 is configured to continue the connection with the content server 150 (FIG. 1), even though the connection with the user or remote terminal 110 has been broken or interrupted. In this situation, the resuming data in the RDB 270 can include the entire last content object that was being downloaded prior to or at the time of the break. In such an embodiment, the DLSM 250 may respond to a request for retrieving information from the renewal URL by sending the record of the entire last requested content object 314 from the RDB 270. Advantageously, this aspect of an embodiment of the present invention saves the user time and does not necessitate the user having to re-surf to the appropriate location and to download the last object from the content sever.

Yet in another exemplary embodiment of the present invention, both methods can be used depending on the entity that was disconnected. If the user or remote terminal 110 was disconnected, then the second method can be implemented and the DLSM 250 (FIG. 2) may maintain the connection with the content sever and retrieves and records the entire object to be stored in the relevant location in the RDB 250. If the connection with the content server 150 was broken, then the first method is used and the last URL is stored in the appropriate location in the RDB 250.

After sending the resuming information, the STM 280 can be informed 314 about the resuming session with information on the relevant entry in the users table. From the users table, the STM 280 may collect information on the user as well as the URL of the content object. Timer Tr, which is initiated upon identification of a break in the connection (as will be described in connection with FIG. 3C, is stopped 314. Timer Tr is configured to define the lifetime of a DLSM 250 from the moment that its associated download process was disturbed. In addition, the "breaking indication" in the relevant entry of the users table that is associated with the DLSM 250 is reset and the relevant loop for checking the timer Tr (FIG. 3C) is terminated. The method 300 then returns to step 306 looking for a next packet.

In an exemplary embodiment of the present invention, in which a DLSM 250 is opened for each request to set a TCP connection and is likewise terminated when the relevant TCP connection is terminated. The FDLSM 240 is responsible to associate the new DLSM 250 with the relevant entry in the user's table. In addition, from time to time the FDLMS 240 may search the users table looking for old entries. Old entries can be identified by the time of the download session that was recorded. An entry that was recorded before T2 is considered an old entry. T2 can be few tens of minutes to few hours. Resources of old entries in the RDB and the users table can be released Returning now to step 312, if the URL of the request is not the renewal URL, then a decision is made 320 as to whether the "Renewal indication" in the relevant entry in the uses table is true. If the renewal indication in the relevant entry is not true 320 method 300 proceeds to step 324. However, if the renewal indication is true, indicating that the user does not wish to resume the last session by using the resuming information, then the relevant section in the RDB 270 is released 322, and the STM 280 is informed about the refusal of the user to resume the last session. After collecting the information on the user and the URL by the STM 280 (FIG. 2) the relevant entry in the use's table is released.

However, at step 324 when the renewal indication is not true, a new page indication is set in the entry of the users table that is assigned to the session. The new URL is saved in the appropriate field in the assigned entry (assigned entry, associated entry, appropriate entry and relevant entry can be used interchangeably) and a location in the RDB 270 is allocated and assigned to this session. Furthermore, a message with the IP address of the user or remote terminal 110 is sent to the CM 220 (FIG. 2) to instruct the TCP stack to spoof the IP source address of the packet and use the source address of the user or remote terminal 110 instead of the DRS 134 (FIG. 1). Then the request is transferred via the HTTP proxy 230 and the CM 200 toward the content server 150 and the method 300 returns to step 306 looking for the next packet in the queue.

Referring now to FIG. 3B, the portion of method 300 which deals with a received packet that was identified 310 (FIG. 3A) as other than a request to a web page is described. At step 330, a decision is made as to whether the packet is a content object or an ML. Several methods can be used to identify the downloading of a content object. For example, one method may compare the URL of the payload carried by the current packet with a list of URLs of content servers. The list may reside in the shared memory 260 (FIG. 2). Other methods may check the type of the file that is embedded within the payload of the current packet. File types like the following non-limiting examples can be used to point to a content object: mp3, mpg, mp4, avi, etc. Yet in an alternate method, a content object can be identified by the content type field in the HTTP header of the current packet. For example, a Digital Rights Management (DRM) type, Executable type, etc. may point to a content object. In implementations in which billing is involved, an embodiment of the present invention may receive the billing header that is added by the content provider to the packet.

One of or any combination of the above identifying methods can be used by different embodiments of the present invention.

If the current packet does not belong to a content object 330, then a notification on the current packet is added 331 to the assigned entry in the users table (the notification can include the URL, indication that the request is not for a content object, etc.); the packet is returned to the HTTP proxy to be sent to its destination and method 300 returns to step 306 (FIG. 3A) looking for the next packet in the queue.

If billing is involved in the content object downloading process, exemplary method 300 may be slightly modified to include an additional decision point (not shown), in which a decision is made whether the packet is a message associated with a purchase. If it is a purchasing session, then an indication may be added to the assigned entry in the users table. The indication may invoke the transmission of a rollback CDR if and when the download process is broken or interrupted.

On the other hand, if the current packet belongs to a content object or a ML file 330, then another decision is made as to whether the breaking indication in the assigned entry in the users table is true 332. If the breaking indication is not true, then a decision is made as to whether the packet is the beginning of a new content object 340.

If the packet belongs to a new content object 340, then method 300 proceeds to step 342. However, if the packet does not belong to a new content object 340, then (a) the packet is stored 346 in appropriate location in the RDB 270, (b) the relevant entry in the users table is updated, and (c) the current packet is transferred toward the user or remote terminal 110 (FIG. 1) via the HTTP proxy 230 (FIG. 2), the CM 220 and the redirector 210. The method 300 then waits 344 to get an indication from the HTTP proxy 230 as to whether the packet has successfully reached its destination.

If the transferring of the packet to its destination was successfully completed 350, then the method 300 returns to step 306 (FIG. 3A) looking for the next packet in the queue. If the packet was not successfully transferred to its destination, which means that the connection with the destination of the packet has been disturbed and the download process was unsuccessfully terminated, then method 300 proceeds to step 352 in FIG. 3C.

Returning now to step 332, if the breaking indication is true, then a decision is made as to whether the current content object belongs to an ML file 334. If the current content object does not belong to an ML file, the timer Tr is stopped, and the breaking indication in the assigned entry in the users table is reset. The method 300 then proceeds to step 340.

However, if the current packet belongs to an ML file 334 then in process 338 (a) the "breaking indication" is removed from the relevant entry in the users table; (b) a renewal indication in the relevant entry in the users table is set, and then the ML file is modified and a new link is added. The new link prompts the user to use the resuming information that is stored in the DRS 134 (FIG. 1). This link points to a URL, which is referred in this discloser as the resuming URL. The method 300 then proceeds to step 340.

Returning now to step 342, if the content object is a new object then (a) the "new object indication" is set in the relevant entry in the users table, (b) a location in the RDB 270 is allocated and (c) the packet is stored in the RDB 270. In alternate exemplary embodiment of the present invention, only information on the packet is stored—information that can accelerate the recovery from a break in the connection. The relevant entry in the users table is updated. Then the current packet is (d) transferred toward the user or remote terminal 110 (FIG. 1) via the HTTP proxy 230, the CM 220 and the redirector 210 (FIG. 2). The method 300 then waits 344 to get an indication, from the HTTP proxy 230, as to whether the packet has successfully reached its destination.

Referring now to FIG. 3C, the portion of method 300 which deals with the unsuccessful download process as detected in step 350 (FIG. 3B) is described. Upon determining that the current download process was unsuccessfully terminated, at step 352 (a) a timer Tr (Time for waiting to Recovery) is initiated; (b) a breaking indication is set in the relevant entry in the users table; and (c) the relevant entry in users table as well as the assigned section in the RDB 270 are saved 352. An indication on the event can be sent to the statistical module STM 280.

A loop that includes steps 354 and 356 is then entered. The loop continually checks the value of timer Tr in comparison to the value of T2 354. The loop can be terminated in one of two situations. First of all, the loop can be terminated if the user or remote terminal 110 renews the connection with the SPP 130 (FIG. 1), as is described in step 314 (FIG. 3A). Secondly, the loop can be terminated if the timer Tr reaches the value of T2 before receiving a new request. The value of T2 can be configured in the range of few tens of minutes to a few hours. If the value of Tr reaches T2, this indicates that the user or remote terminal 110 gave up and therefore the relevant entry in the users table, as well as the relevant section in the RDB 270 are released 358. The indication can be sent to the STM 280 and the process 300 terminates 360.

In alternate exemplary embodiment of the present invention, the method 300 can be modified (not shown) in such a manner that if the connection between the DRS 134 and the content server 150 (FIG. 1) is still active, then the DRS 134 may continue (in modification of step 352) the download process, and storing the information of the entire content object in the assigned section of the RDB 270. This content can be used when a request to the resuming URL is received.

Yet in another exemplary embodiment of the present invention, a CDR message can be sent to the BillGW 136 (FIG. 1) rolling back the transaction.

Overall, this invention will improve the experience of a person surfing the Internet and downloading content. The various embodiments of the invention improve the surfer's experience during the downloading of content objects, reduces the download time of a retrial session, alleviates incorrect charges for aborted downloads and maintains the confidentiality of the user when purchasing content objects.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. It will be appreciated that the above described modules may be varied in many ways, including, changing the number of modules, and combining two or more modules into one. Dividing the operation of a certain module into two or more separate modules, etc.

It will be appreciated that the above described methods may be varied in many ways, including, changing the order of steps, and the exact implementation used. It should also be appreciated that the above-described description of methods and apparatus are to be interpreted as including embodiments of an apparatus for carrying out the methods and methods of using the apparatus. The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments

What is claimed is:

1. A method for managing content download sessions over a global data network, the method comprising:
   detecting, at a download resuming server ("DRS"), the commencement of a downloading process of a content object from a content server to a remote terminal, wherein the DRS resides at an intermediate node between a plurality of content servers and a plurality of remote terminals such that a downloading process from a content server to a remote terminal is transmitted through the DRS;
   the DRS monitoring the downloading process;
   the DRS storing resuming information pertaining to the downloading process of the content object;
   the DRS detecting a discontinuity in the connection between the DRS and the remote terminal, wherein the discontinuity indicates that the downloading of the content object to the remote terminal has been prematurely terminated;
   continuing the downloading process of the content object from the content server to the DRS after detecting the discontinuity in the connection between the DRS and the remote terminal until the entire content object is downloaded from the content server;
   storing the entire downloaded content object, including the portion that has been downloaded after detecting the discontinuity in the connection between the DRS and the remote terminal, as resuming information pertaining to the premature termination of the downloading process of the content object to the remote terminal; and
   administering a resolution pertaining to the prematurely terminated downloading process.

2. The method of claim 1, wherein the act of detecting the commencement further comprises detecting a request originating from a remote terminal to download a content object from a content server.

3. The method of claim 1, wherein the act of administering the resolution further comprises resuming the downloading process to the remote terminal based at least in part on the resuming information.

4. The method of claim 1, wherein the act of storing resuming information further comprises the act of storing the uniform resource locator ("URL") of the content object being downloaded.

5. The method of claim 1, further comprising the acts of detecting a discontinuity in the connection between the DRS and the content server and storing resuming information comprised of the URL of the content object being downloaded.

6. The method of claim 4, wherein the act of administering the resolution further comprises resuming the downloading process to the remote terminal by detecting an access to a renewal URL and identifying it as a renewal request.

7. The method of claim 1, wherein the act of storing resuming information comprises storing the content object.

8. The method of claim 1 further comprising the act of resuming the downloading process, wherein the act of resuming comprises detecting a renewal request and commencing the download of the stored content object from the DRS to the remote terminal.

9. The method of claim 1, wherein the act of administering the resolution further comprises sending a rollback call detail record (CDR) to a billing gateway.

10. A method for managing content object downloading sessions at an intermediate node between a plurality of remote terminals and a plurality of content servers, the method comprising:
   a. tracking, at the intermediate node, the download process of a content object from a content server to a remote terminal;
   b. storing resuming information;
   c. determining, at the intermediate node, when the download process is terminated before completion;
   d. identifying a request for resuming the download process; and
   e. sending, from the intermediate node, the stored resuming information to the remote terminal;
   wherein the action of determining when the download process is terminated before completion comprises the action of detecting a discontinuity in a connection between the intermediate node with the remote terminal or detecting a discontinuity in a connection between the intermediate node with the content server;
   wherein if the discontinuity is detected in the connection with the content server, then storing the uniform resource locator (URL) of the content object being downloaded; and
   wherein if the discontinuity is detected in the connection between the intermediate node to the remote terminal, then continuing the download process from the content server to the intermediate node until downloading the entire content object, and storing, the entire data of the content object including the downloaded data, which was downloaded during the discontinuity in the connection between the intermediate node with the remote terminal, as resuming information.

11. The method of claim 10, further comprising sending a call detail record CDR to a billing gateway.

12. The method of claim 10, further comprising storing a URL pointing the content object when the connection with the content server was broken.

13. The method of claim 10, further comprising reducing the timeout interval.

14. The method of claim 10, further comprising spoofing the source IP address that are sent to the content server.

15. A download resuming server ("DRS") that manages content object download sessions, the DRS comprising:
   a communication module that intercepts data communication between a plurality of remote terminals and a plurality of content servers, the communication module comprises a TCP stack and a HTTP proxy;
   a recovery memory; and
   a plurality of downloading sessional modules (DLSM), wherein each DLSM is associated with one remote terminal from the plurality of remote terminals that is currently communicating via the DRS, and wherein each DLSM:
      receives data communication from the communication module that is related to its associated remote terminal;
      tracks the download process of a content object from a content server to the associated remote terminal;

stores resuming information in the recovery memory;
determines when the download process unsuccessfully terminates;
identifies a request for resuming the download process; and
sends the stored resuming information to the associated remote terminal;

wherein the DRS is installed in an intermediate node between the plurality of remote terminals and the plurality of content servers; and wherein each DLSM continues the download session from the content server to the DRS when the connection between the DRS and the remote terminal, which is associated with the DLSM, was broken, until downloading the entire content object, and the stored resuming information comprises the entire content object including content data that was downloaded to the DRS from the moment that the connection between the DRS and the remote terminal was broken.

16. The DRS of claim 15, wherein the communication module spoofs the source IP address of a packet that is sent toward a content server.

17. The DRS of claim 15, wherein the DLSM sends a call detail record (CDR) to a billing gateway.

18. The DRS of claim 15, wherein the communication module is further adapted to reduce a timeout interval to a retransmit request.

* * * * *